May 16, 1950  J. H. STRAUSSBERGER  2,507,533
METHOD OF AND MEANS FOR CHANGING THE WIDTH OF A
KNITTED FABRIC DURING THE KNITTING OPERATION
Filed Oct. 25, 1944  2 Sheets-Sheet 1
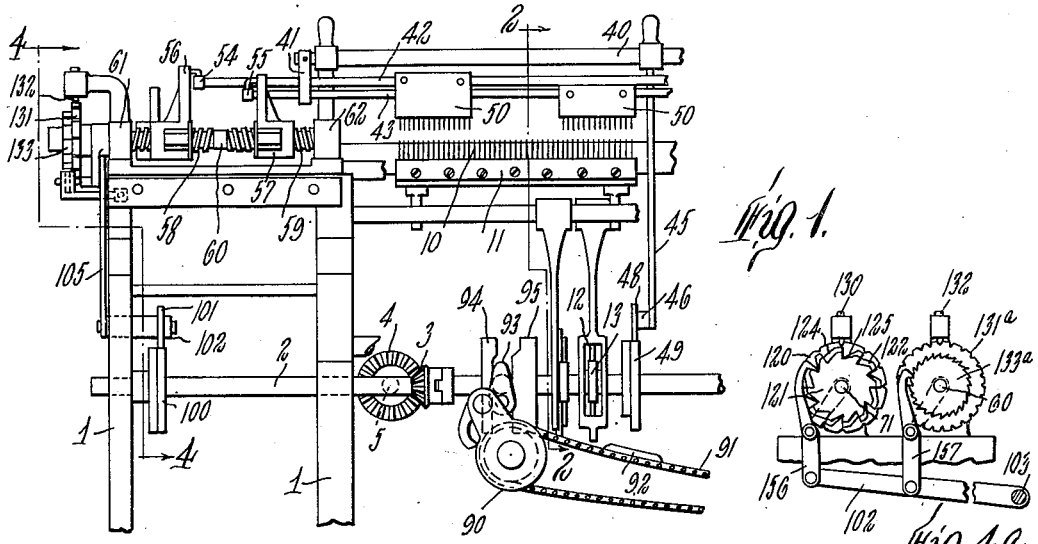
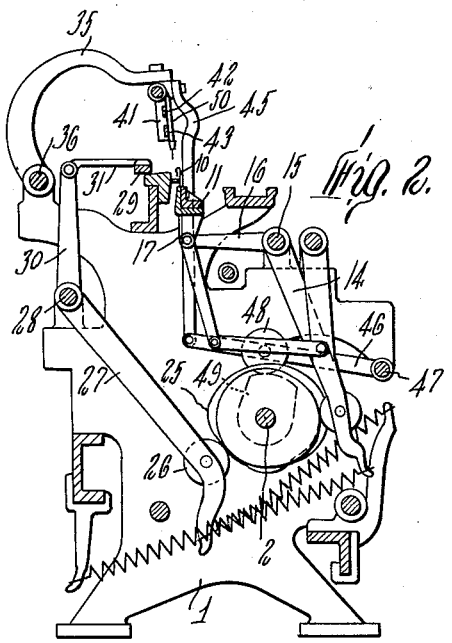
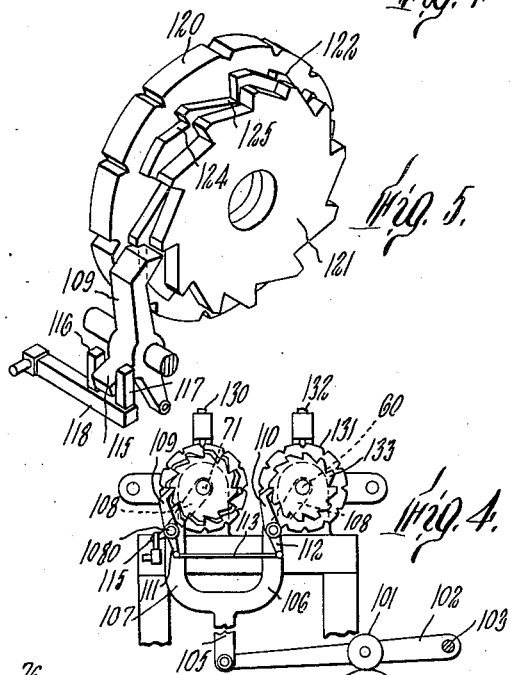
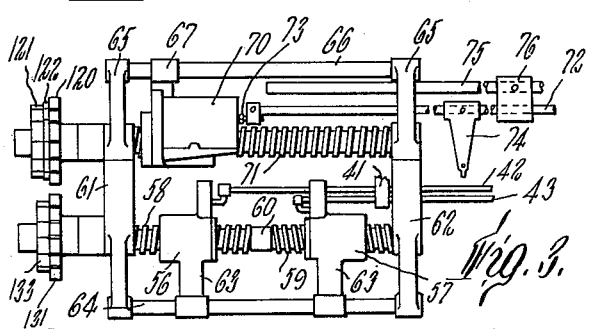
Inventor
John H. Straussberger
by Wright Brown Quinby
+ May  Attys.

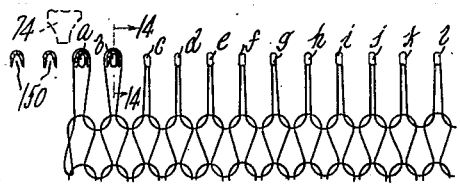
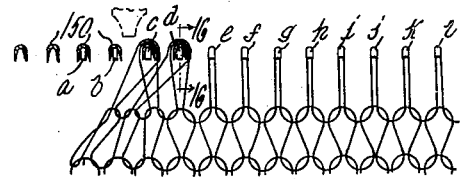
Fig. 6. Fig. 7.
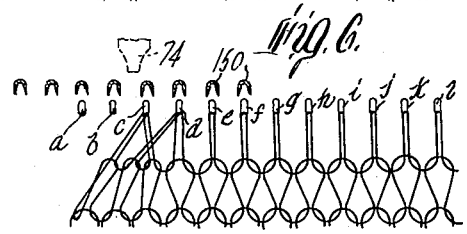
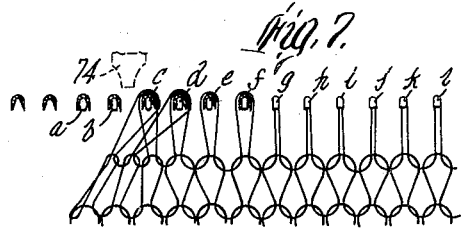
Fig. 8. Fig. 9.
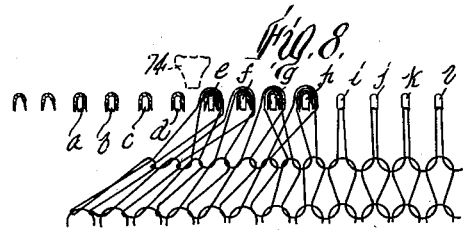
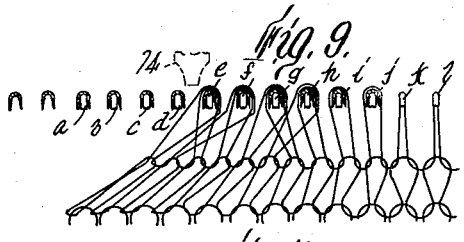
Fig. 10. Fig. 11.
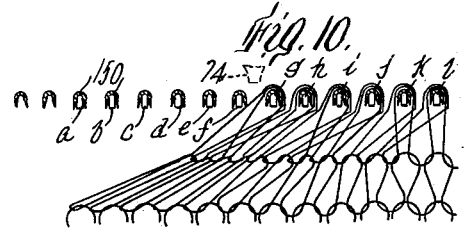
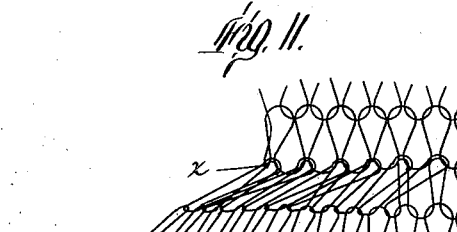
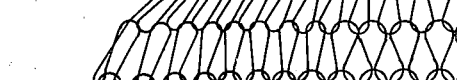
Fig. 12.
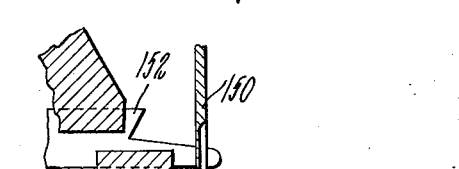
Fig. 13.
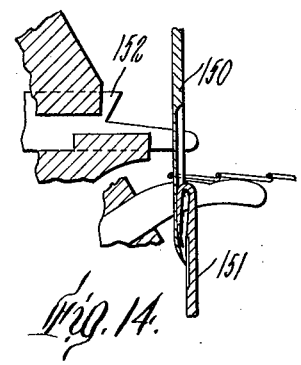
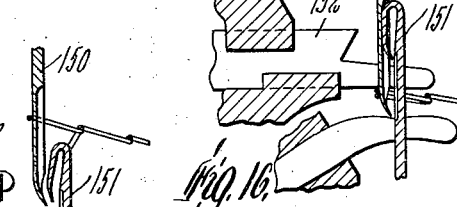
Fig. 14. Fig. 15. Fig. 16.
Inventor
John H. Straussberger
by Wright Brown Quinby May
Attys.

Patented May 16, 1950

2,507,533

UNITED STATES PATENT OFFICE 2,507,533

METHOD OF AND MEANS FOR CHANGING THE WIDTH OF A KNITTED FABRIC DURING THE KNITTING OPERATION

John H. Straussberger, Sound Beach, N. Y.; Hamilton National Bank, executor of said John H. Straussberger, deceased, assignor, by direct and mesne assignments, to Julius Kayser & Co., New York, N. Y., a corporation of New York Application October 25, 1944, Serial No. 560,220

6 Claims. (Cl. 66—89)

1

In the production of knitted goods on a flat knitting machine narrowing and widening of the fabric as it is being knitted has heretofore been accomplished but to a limited extent, commonly this width-change being limited to not over four stitches in a single course. This is quite insufficient to take care of rapid contour changes as is necessary, for example, in knitting around the heel and at the toe of a stocking, and consequently it has been customary to employ special machines for knitting those portions of the stocking.

The present invention has for an object, therefore, to provide a method of and means by which narrowing or widening may be accomplished in a single course on the flat knitting machine to any extent desired up to substantially one-half of the previous width in narrowing, or doubling the previous width in widening, thus avoiding the necessity of using separate machines to knit the toe or heel and permitting the completion of the knitting operation on a stocking on a single machine.

A further object is to provide a method of and means for automatically manipulating the usual narrowing and widening devices of a flat knitting machine to perform a plurality of narrowing or widening cycles in a single course.

For a complete understanding of this invention, reference may be had to the accompanying drawings in which:

Figure 1 is a fragmentary front elevation of a flat knitting machine arranged to narrow in accordance with this invention.

Figure 2 is a vertical sectional view on line 2—2 of Figure 1.

Figure 3 is a fragmentary top plan view of the parts shown in Figure 1.

Figure 4 is a sectional view on line 4—4 of Figure 1.

Figure 4a is a view similar to a portion of Figure 4, but showing mechanism for widening.

Figure 5 is an isometric view of the carrier stop control.

Figures 6 to 13, inclusive, are somewhat diagrammatic views showing successive steps in a multiple narrowing operation effected in two loop deliveries.

Figures 14, 15 and 16 are detail sectional views showing successive relations between a needle, narrowing point, divider or sinker, and a knockover bit during a narrowing operation, Figures 14 and 16 being sectional views on the correspondingly numbered section lines of Figures 6 and 7, respectively, and Figure 15 showing the position

2 of the parts slightly later in the cycle than Figure 14.

Referring first to Figures 1, 2, and 3, a portion of a flat knitting machine is illustrated, including the supporting frame members 1 within which is journaled the usual cam shaft 2. This cam shaft, as shown, has journaled thereon a beveled pinion 3 which is in mesh with a beveled gear 4 on a transverse shaft 5. This transverse shaft 5 is arranged to drive the usual Coulier motion which causes the parts to cooperate with the needles to perform the knitting cycles in the well known manner. The needles 10 are carried by the usual needle bar 11, which is given an up and down motion by a cam 12 on the shaft 2 through a cam follower 13 carried by an arm 14 fixed to a rock shaft 15, a rocker 16 pivoted to a link 17 supporting the needle bar, completing this operative connection. The usual forward and back motions of the needle bar are derived from any suitable mechanism as is well known in the art and a portion of which is shown in Figure 2. The sinkers and dividers are moved backwardly and forwardly by a cam 25 on the shaft 2, acting upon a follower 26 carried by an arm 27 secured to a rock shaft 28. This rock shaft 28 is connected to the catch bar 29 through the pivoted links 30 and 31. A pair of curved arms 35 fulcrumed at the back of the machine on the shaft 36 and projecting forwardly thereover carry a rod 40 which has bearings 41 thereon through which are slidably guided point carrier rods 42 and 43. The rod 40 has arms 45 depending therefrom, the lower ends of which are pivoted to links 46 fulcrumed at 47 at the forward portion of the machine, and a cam follower roll 48 fulcrumed on each of the links 46 and engaging on a cam 49 on the shaft 2 serves to swing the forward end of the arms 35 upwardly or downwardly, causing the combs 50, one fixed to the bar 42 and the other to the bar 43, to be lifted into inoperative position or lowered into position for their points 150 to take loops of thread on or off the needles for the width-changing operations. The width-changing rods 42 and 43 have stops 54 and 55, respectively, which are pressed into engagement with the adjacent faces of the nuts 56 and 57, respectively, threaded on reverse direction threaded portions 58 and 59 of a spindle 60 journaled in bearings 61 and 62. The nuts are held against rotation with the spindle 60 by extensions 63 thereon slidably guided on a guide rod 64 extending between the bearings 61 and 62. The bearings 61 and 62 also have rearward extensions 65 within which is mounted a guide bar 66.

On this guide bar is slidably guided a rearward extension 67 of a carrier rod nut 70 threaded onto a screw 71. A carrier rod 72, suitably guided for axial motion, has a stop 73 arranged to engage the inner face of the carrier nut 70. The carrier rod 72 has secured thereto the yarn carrier 74 which is reciprocated to lay the yarn for successive courses by reciprocation of a friction box rod 75 to which is secured a friction box 76 through which the carrier rod 72 passes and by which it is frictionally gripped.

As is well known in the art, the friction rod is moved laterally in a path of constant amplitude, but the amplitude of reciprocation of the yarn carrier rod 72 is limited by the setting of the nut 70 at one end of its travel and by a corresponding nut (not shown) traveling on a screw 71 like that shown in Figure 3, but facing in the opposite direction. Thus the two stop nuts are moved from and toward each other by equal amounts at each actuation of either, this determining the length of the path of motion of the yarn carrier in accordance with the width of the goods being knitted at any one time.

The transfer of needle loops to effect the width changing operation is accomplished by the turning of the shaft 71 in timed relation with the relative lowering and lifting of the needles 151 and the points 150 in predetermined cycles, some of the many possible cycles being hereinafter described. According to the present invention such cycles are repeated a plurality of times in a single course. At some convenient time or times during the number of loop transferring cycles performed in a single course to produce the desired extent of width change, the screw 60 is manipulated to change the limits of motion of the yarn carrier, in accordance with the changed width, for the subsequent knitting cycles. When this invention is applied to or performed by machines of well known types, it will be usually convenient to adjust the screw 60 simultaneously with certain of the turning impulses imparted to the shaft 71 as will hereinafter appear.

In the examples which follow it will be noted that there are never more than two thread loops at any one time on any needle or delivery point as this results in a fabric having the best appearance.

During the width-changing operations, the threaded spindle 60 and the screw 71 are rotated step by step in the proper direction for the particular width-changing desired, whether narrowing or widening, and this action takes place when the cam shaft 2 is in its axial position in which the clutch connection between it and the pinion 3 is opened so that the Coulier motion is inoperative.

For the present invention, however, instead of the Coulier motion being inoperative during only one narrowing or widening cycle, it is held out of operation during a plurality of such cycles. The mechanism commonly employed for throwing out the Coulier motion consists of a chain motion shown diagrammatically in Figure 1 at 90. An endless chain 91 carries a plurality of dogs, such as 92, which as the chain is driven through its endless path, act while in certain definite positions to interpose a cam follower 93 between a pair of cams 94 and 95 on the shaft 2 so formed as to produce the desired axial motion of the cam shaft 2 to move it out of its normal knitting axial position into its width-changing position. In previous constructions each dog 92 is short, being long enough only to hold the shaft 2 in width-changing condition during a single width-changing cycle during a single rotation of the shaft 2. In accordance with the present invention a longer dog 92 is employed, its length being sufficient to hold the Coulier motion idle and the machine in width-changing condition during the desired plurality of width-changing cycles.

The turning of the screw shafts 60 and 71 is accomplished by ratchet mechanism, but for the present invention the ratchet mechanism, as herein shown, is somewhat modified from that commonly employed, and is shown particularly in Figures 4 and 5 for a multiple narrowing operation, each operation narrowing by two needle loops.

Assuming that the shaft 2 is in width-changing position, a double lobed cam 100 carried thereby (see Figure 4) is in position to impinge upon a cam roller 101 carried by an arm 102 fulcrumed at 103, the arm 102 being connected to the lower end of a bifurcated link 105, the two arms 106 and 107 of which are pivoted at the outer end of hangers 108 fulcrumed on the screw shafts 71 and 60. On each of these pivotal connections 1080 between the bifurcated link 105 and the arms 108 are pivoted pawls 109 and 110 having downwardly extending portions 111 and 112 connected together through a link 113. One of the pawls, as 109, has an extension 115 which rides between a pair of posts 116 and 117 on an axially slidable bar 118.

The screw shaft 71 has fixed thereon a peripherally notched wheel 120 and a ratchet wheel 121 and between them is journaled a second ratchet wheel 122. The journaled ratchet 122 has alternate high and low step portions 124 and 125 around its periphery. When the pawl 109 is in position, as controlled by the axial position of the bar 118, to engage both ratchet wheels 121 and 122, as the pawl is moved up and down by the reciprocation of the link 105, it rides over the teeth of the ratchet wheel 121 whenever it engages a high step 124 and fails to turn the ratchet wheel 121, but on its succeeding up stroke when it engages a low step portion 125, it engages a tooth of the ratchet wheel 121 and turns the ratchet wheel 121, and consequently turns the screw shaft 71 by one ratchet tooth. The notched wheel 120 has a spring pressed detent 130 cooperating therewith (Figure 4) and engaging in its notches to prevent reverse rotation of the screw shaft by down motion of the pawl 109.

The screw shaft 60 has a similar notched disk 131 with its cooperating spring pressed detent 132, and it also carries a ratchet wheel 133 with which the pawl 110 cooperates. On each upward motion of the link 105, the screw 60 is rotated by the amount of one ratchet tooth, while, as before noted, only each alternate upward motion of the link 105 produces rotation of the screw 71. When the narrowing action of the present invention is in operation, the pawl 109 is in position to engage both of the ratchet wheels 121 and 122 and thus turns the screw 71 at each alternate action only, while the screw 60 is turned the angular distance of one ratchet tooth at each upward motion of the member 105. If a single narrowing action only is desired in one course, the bar 118 may be moved axially to bring the pawl out of contact with the ratchet wheel 122 and a single lobed cam is substituted for the cam 100, and using a short dog 92, the narrowing may proceed in accordance with usual practice.

In Figures 6 to 13, inclusive, there is shown diagrammatically the narrowing action at one side of the fabric in accordance with this invention when each narrowing cycle delivers two needle loops inwardly. Referring to Figure 6, the limiting outward position of the carrier 74 is shown in dotted lines, and the narrowing points 150 of the left hand comb 50 are so positioned that on the first descent of these points, the two on the extreme right enter the first two loops on the needles a, b at the left hand side of the fabric. Each of these points so entering a loop, takes the loop thereon as shown in Figure 14, the bearded needle 151 being then pushed over against the point 150 so that the beard is closed and the loops are taken thereon. The needle then further descends, removing the loops from needles a, b as in Figure 15. The screws 60 and 71 are then turned by their pawls 109 and 110, moving the nuts 70 and 56 inwardly by the spacing of two needles, this bringing the carrier 74 into the position shown in Figure 7 between the second and third point from the right hand end and carrying the needle loops from the needles a and b laterally, and delivering them around the two needles c and d, respectively, next inwardly adjacent to those from which they are removed. There are now two loops of yarn on the two points at the needles c and d at the left side of the fabric and the fabric has been narrowed at the left edge by two needles. The points are then lifted, leaving the two loops on the two needles c and d at the left hand edge of the fabric since at this portion of the cycle the sinkers and dividers 152 are in position to prevent the loops from being retained by the points, as shown in Figure 16, and the points without any loops thereon are moved inwardly, or to the right, a distance of two more needles on the next up-stroke of the link 105. This inward motion of the needles is accomplished by this upward motion of the link 105, but at this time the pawl 108 is riding on a high step portion 124, which holds it out of contact with the teeth of the ratchet wheel 121 so that the carrier remains in the position of Figure 7, the points and the thread loops being then as shown in Figure 8. It will be noted that the two needles c and d at the left hand edge of the fabric and carrying two loops each, are now opposite to points which are spaced from the right hand edge of the comb by two points.

On the next descent of the comb, four of the points then pass through and take needle loops, the two at the extreme right of the comb passing through single loops on needles e and f and the next two passing through double loops on needles c and d.

At the next up-stroke of the link 105, both of the shafts 60 and 71 are rotated, thus causing both the carrier 74 and the combs to move inwardly by two needles. This causes the two single loops at the two inner needles e and f of Figure 9 to be delivered inwardly and deposited on the next two needles g and h inwardly thereof which already have one loop each, while the two loops of thread on the next two needles c and d are removed from these needles and deposited over the needles e and f from which the two single loops were just removed. The parts are then in the position of Figure 10, four of the needles e, f, g, and h, each carrying two loops, and the limiting carrier position 74 being just outwardly of the outermost of these four needles e.

On the next upward motion of the link 105, the points are removed from the needles without loops and are stepped inwardly two more needles while the carrier limit 74 remains at the same point as before.

On the next downward motion of the points, the two points at the extreme right of the comb enter single loops on the needles i and j, while the next four points e, f, g, and h take the double loops from the four needles next outwardly therefrom (Figure 11).

At the next upward motion of the link 105, the points are moved inwardly two more needles, thus removing the single loops from the needles i and j and despositing them on the next two needles k and l inwardly and transferring the four sets of double loops on needles e, f, g and h inwardly by two needles into the positions shown in Figure 12 onto needles g, h, i and j, the carrier also moving inwardly by two needles. The fabric has now been narrowed by six needles a, b, c, d, e and f, none of which now carry thread loops.

This sequence of operations may continue until the fabric is reduced in width up to one-half its original width, if the operations are continued a sufficient number of times in which case all the needles each carry two loops.

It will be noted that each complete cycle of motion of the points includes one complete rotation of the cam shaft 2, and two up and down motions of the points, in one of these, the points and the carrier stop moving together inwardly by the spacing of two needles, and in the other of which the points alone move inwardly by two needles, and without carrying needle loops thereon. This other is necessary in order that there shall not be more than two loops on any needle at one time.

Assuming that the narrowing has been done sufficiently by the number of operations shown in Figure 12, the knitting cycle is again commenced, the narrowing mechanism being thrown out of operation and with the points lifted, by allowing the shaft 2 to be moved axially into operative relation to the Coulier motion. The knitting then proceeds as shown at the point x in Figure 13, each needle thereafter having but a single loop thereon.

I claim:

1. The method of changing the width of knitted fabric between two successive knitting operations while needle loops of a single course are carried by a series of needles, one loop on each needle, which comprises delivering loops laterally from one needle to another, and then delivering certain of said delivered loops a plurality of times to other needles each carrying no more than one loop.

2. The method of changing the width of a knitted fabric between two successive knitting courses starting from a condition where needle loops of a single course are carried by a series of needles, one loop to each needle, which method comprises delivery a plurality of loops laterally each from one needle to another, and then delivering a plurality of times loops from certain needles progressively differing in number, laterally, in the same direction as the first delivery to other needles each having no more than one loop thereon, until width changing has progressed to the desired extent.

3. The method of changing the width of a knitted fabric between two successive knitting operations starting from a condition where needle loops of a single course are carried by a series of needles, one loop to a needle, which method comprises delivering a plurality of loops laterally each from one needle to another, and then successively delivering laterally a plurality of times and in the same direction loops progressively differing in number to other needles each having no more than one loop thereon, including in each such successive delivery at least one of the loops first delivered.

4. In a flat knitting machine having a plurality of needles arranged side by side and parts cooperating with said needles to make a succession of knitted courses, each needle within the width of the fabric retaining a needle loop thereon, and narrowing mechanism including a plurality of points, the method of narrowing which comprises relatively moving said points, needles, and parts between successive knitting cycles through a plurality of narrowing cycles comprising the deliverance of a plurality of adjacent needle loops inwardly onto other adjacent needles having loops thereon, thereby causing such other needles each to carry a pair of loops, and then moving said points while free from loops inwardly with respect to said needles by the number of loops first delivered, then causing said points to deliver inwardly said pairs of loops and single loops inwardly of said pairs of loops of the same number as those first delivered and with said single loops onto needles already carrying single loops, thus to increase the number of needles having pairs of loops thereon, and continuing such cycles of narrowing operations until narrowing of the fabric to the desired extent has been effected.

5. The method of narrowing a knitted fabric while needle loops of a single course are carried by a series of needles, which comprises delivering two loops on the two outside needles inwardly onto the next two inwardly positioned needles to form double loops thereon, simultaneously delivering the two outermost single loops and the two double loops inwardly by two needles to form four double loops, simultaneously delivering the two outermost single loops and all of the double loops inwardly each by two needles, and repeating the same action until the fabric has been narrowed to the desired extent.

6. A flat knitting machine, comprising knitting instrumentalities including a plurality of needles, a reciprocable yarn carrier, a stop for limiting the stroke of said carrier at each end in accordance with the width of fabric being knitted, a screw threaded through each stop for adjusting the position of said stop by rotation of said screw, narrowing mechanism comprising a threaded spindle, a nut threaded on said spindle, narrowing points operatively connected with said nut, means for raising and lowering said points with respect to said needles, means actuable to render the knitting instrumentalities inoperative to knit and the narrowing mechanism operative, said narrowing mechanism including ratchet devices carried by said screw and spindle, said screw ratchet device comprising a ratchet wheel fixed to said screw and a ratchet wheel adjacent to said fixed ratchet wheel journaled on said screw, a pawl engageable with each of said ratchet wheels, a pawl engaging the ratchet devices carried by said spindle, means for moving said pawls to rotate said ratchet devices, said journaled ratchet wheel having high and low steps, said high steps holding its pawl out of engagement with said fixed ratchet wheel and said low steps providing for such engagement, whereby said fixed ratchet wheel and said screw are turned angularly once during a plurality of angular turns of said spindle to move inwardly said carrier stop once during a plurality of inward motions of said points during at least some of which said points are free from needle loops, and means for relatively moving certain of said instrumentalities just prior to the combined angular motions of said screw and spindle to cause said points to remove loops from some of said needles for delivery inwardly to others of said needles during rotation of said ratchet devices.

JOHN H. STRAUSSBERGER.

REFERENCES CITED

The following references are of record in the file of this patent:

UNITED STATES PATENTS

| Number | Name | Date |
|---|---|---|
| Re. 19,843 | Gastrich | Feb. 4, 1936 |
| 2,081,185 | Schletter | May 25, 1937 |
| 2,168,194 | Dietrich | Aug. 1, 1939 |

FOREIGN PATENTS

| Number | Country | Date |
|---|---|---|
| 8,428 | Great Britain | 1893 |